Aug. 8, 1939.   D. SENSAUD DE LAVAUD   2,168,862
HYDRAULIC DEVICE FOR THE TRANSMISSION OF POWER
Filed Dec. 10, 1936   11 Sheets-Sheet 3
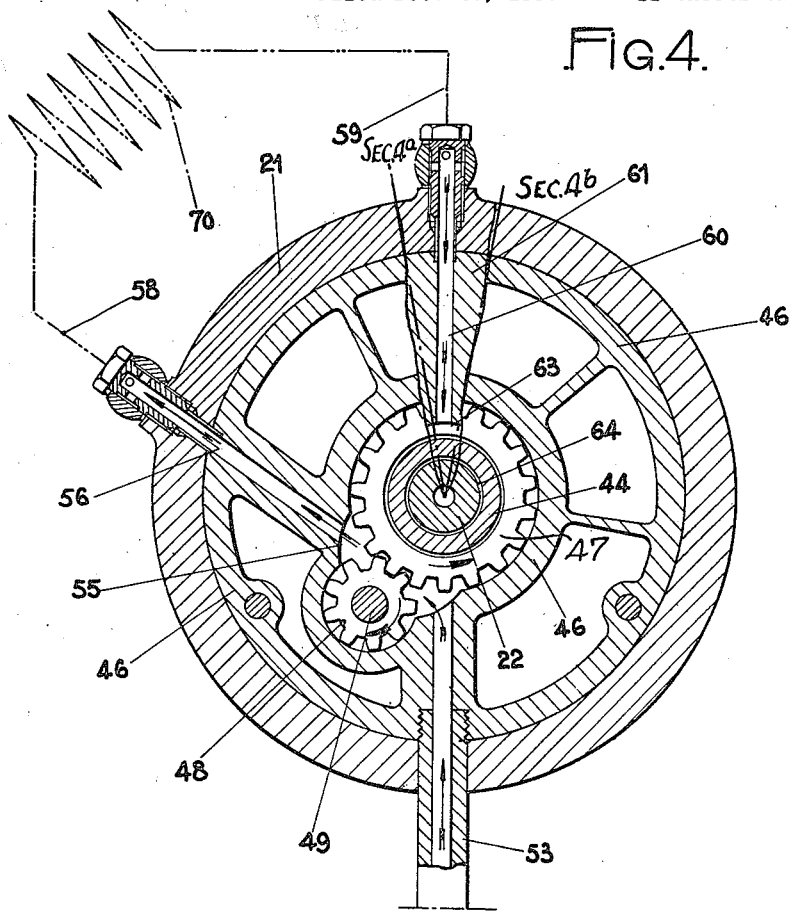
Fig.4.
Fig.5.   Fig.6.
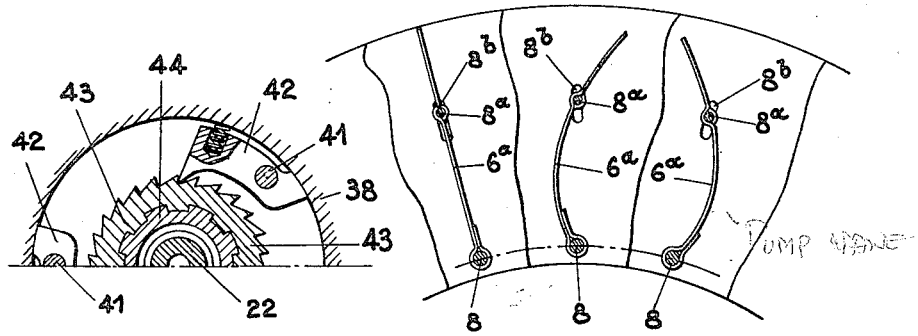
INVENTOR:
DIMITRI SENSAUD DE LAVAUD
BY Haseltine, Lake & Co.
ATTORNEYS

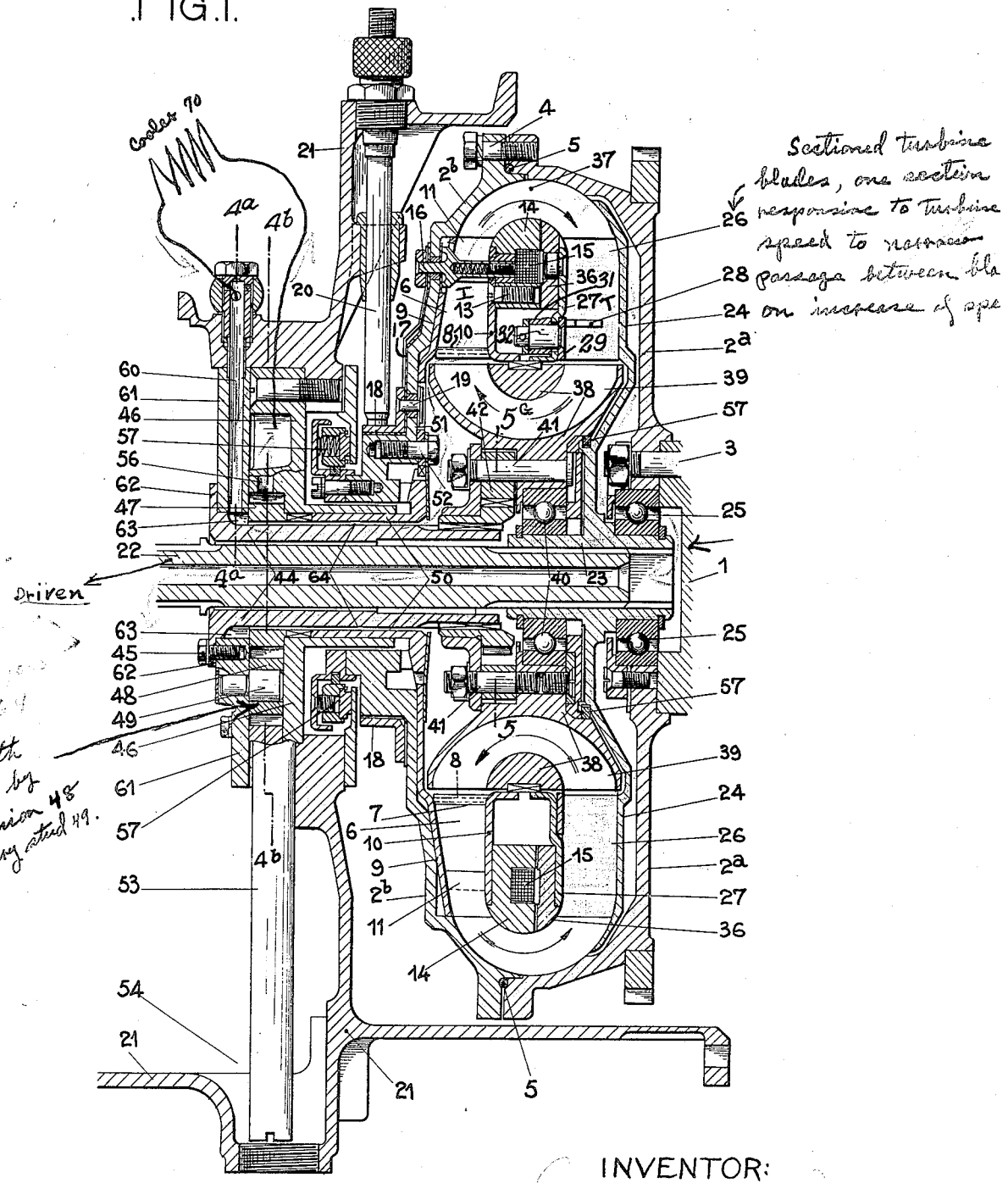
Aug. 8, 1939.    D. SENSAUD DE LAVAUD    2,168,862
HYDRAULIC DEVICE FOR THE TRANSMISSION OF POWER
Filed Dec. 10, 1936    11 Sheets-Sheet 1
INVENTOR:
DIMITRI SENSAUD DE LAVAUD
BY Haseltine, Lake & Co.
ATTORNEYS

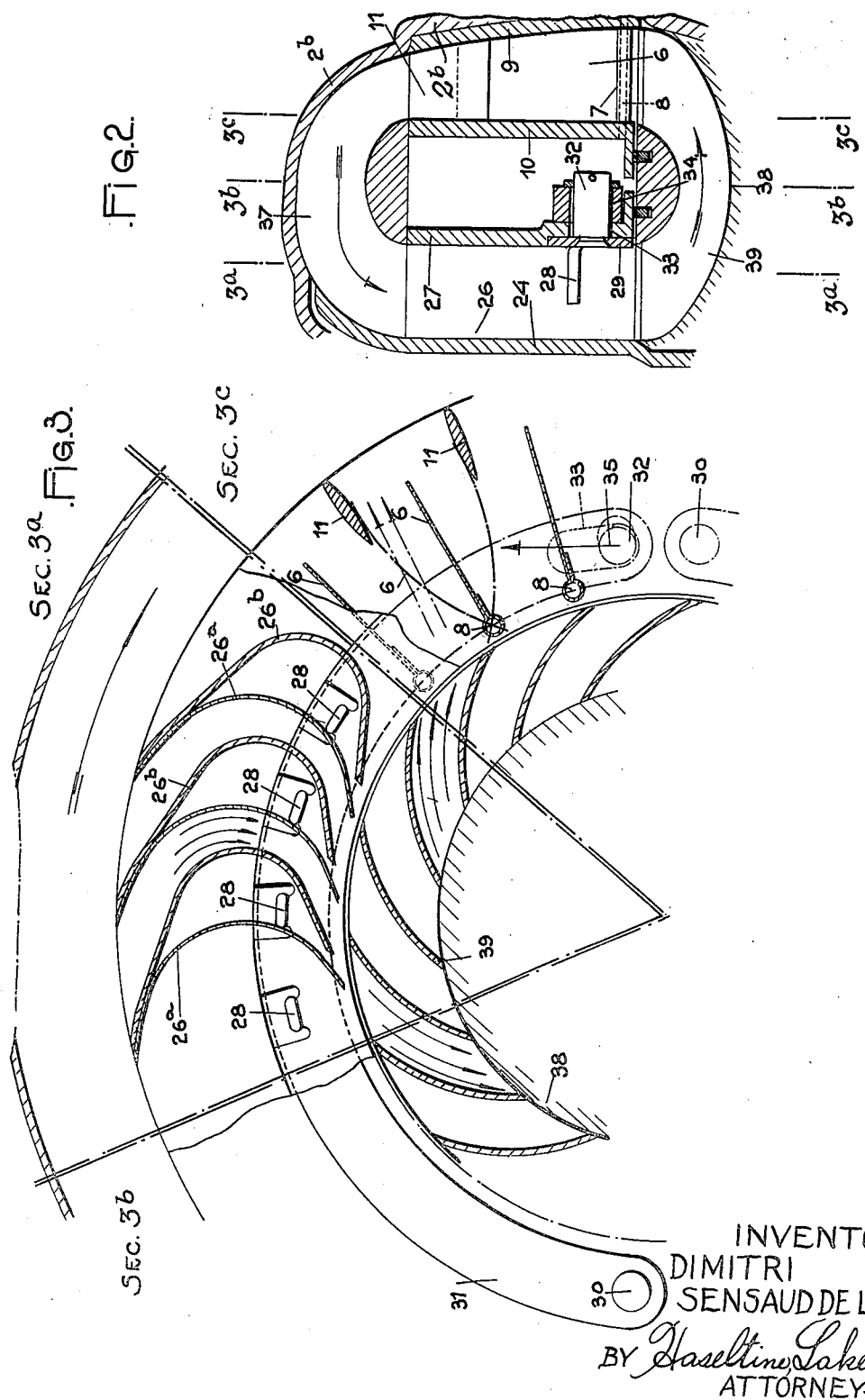

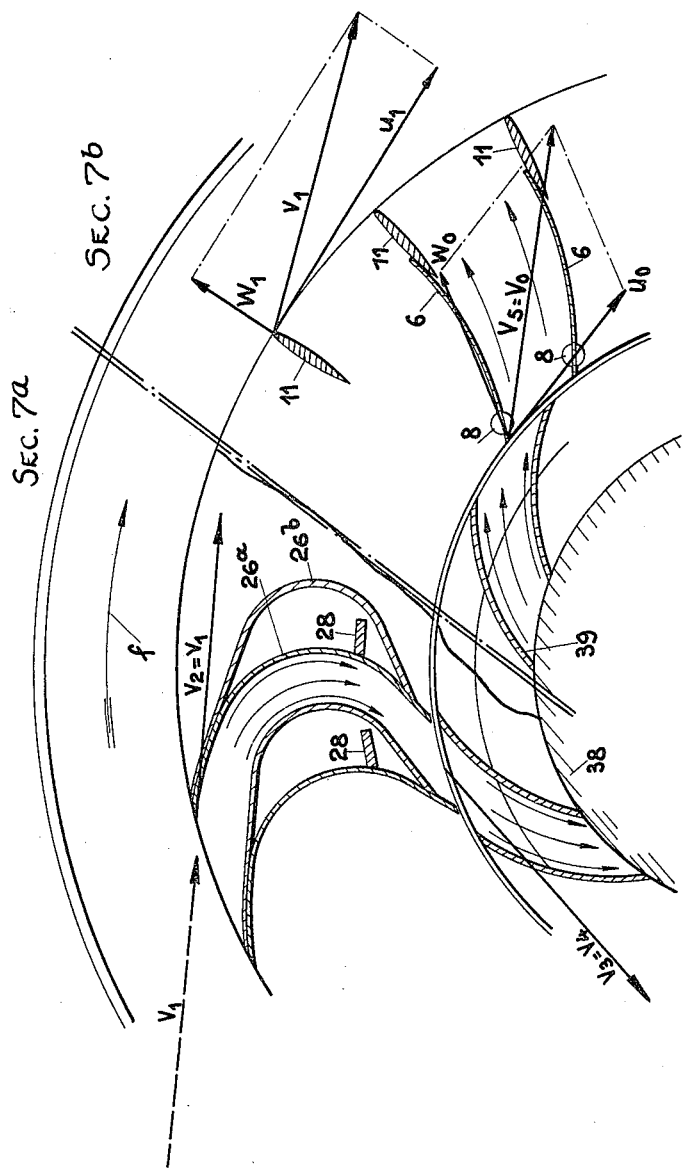

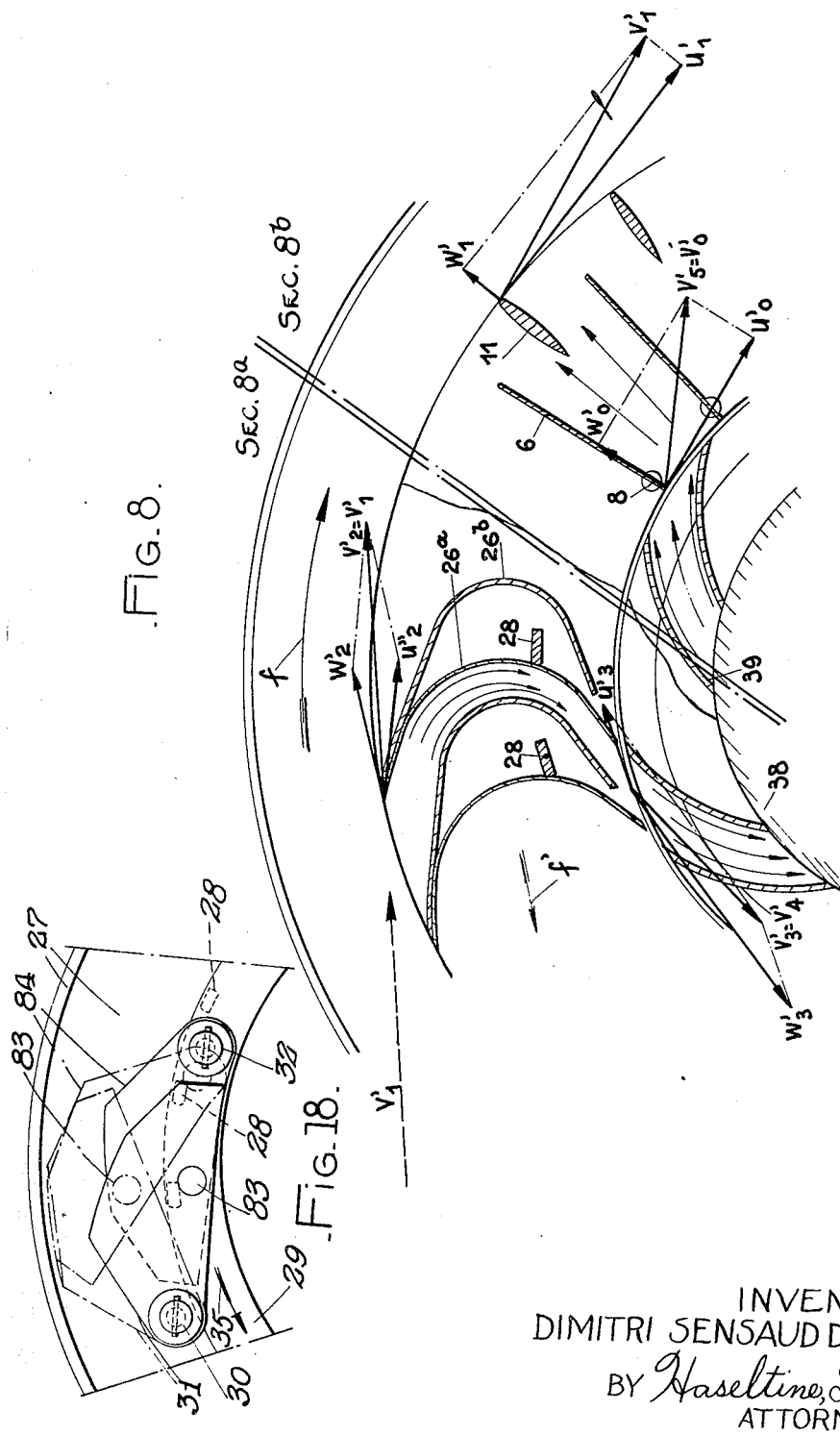

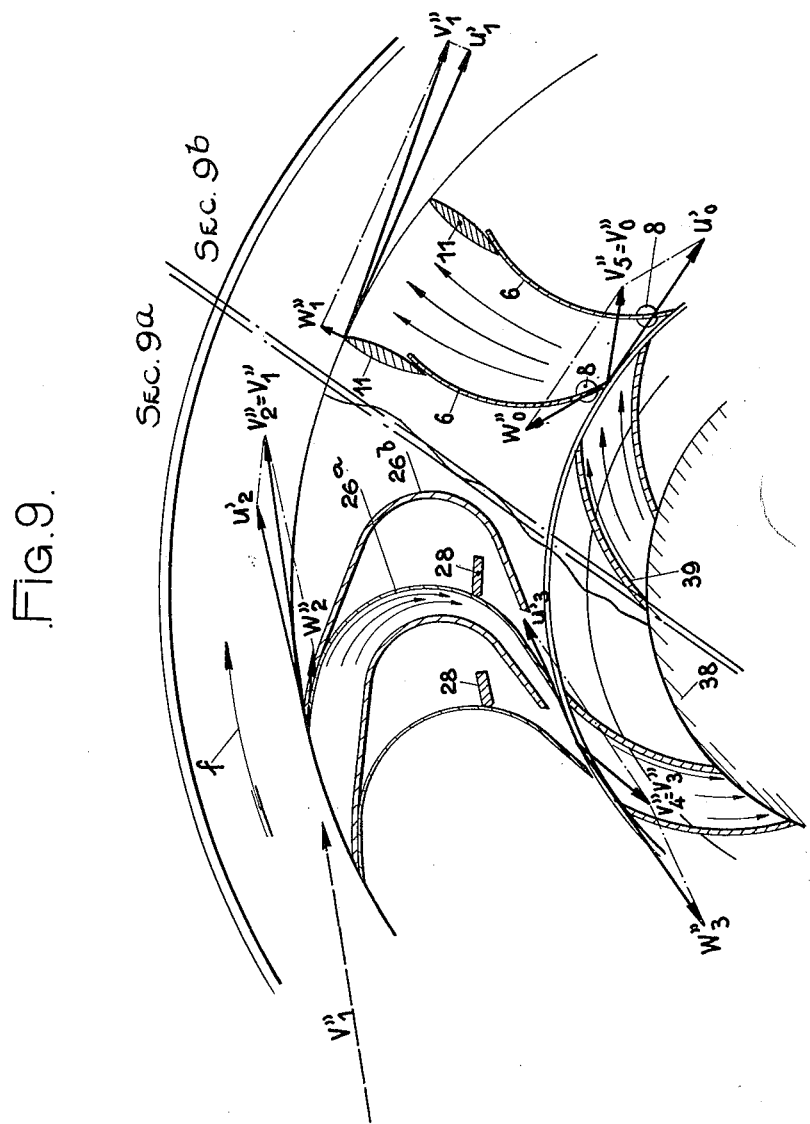

Aug. 8, 1939.    D. SENSAUD DE LAVAUD    2,168,862
HYDRAULIC DEVICE FOR THE TRANSMISSION OF POWER
Filed Dec. 10, 1936    11 Sheets-Sheet 7
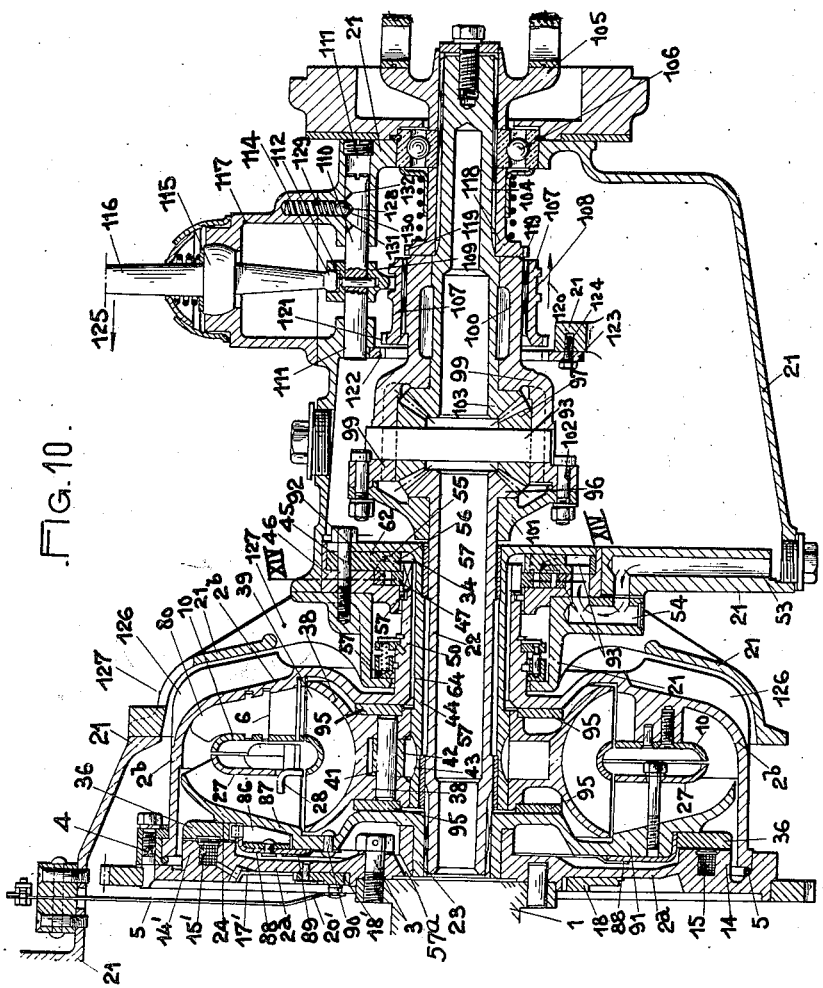
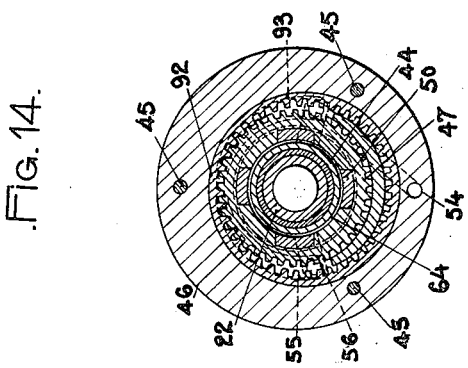
INVENTOR:
DIMITRI SENSAUD DE LAVAUD
BY Haseltine, Lake & Co.
ATTORNEYS

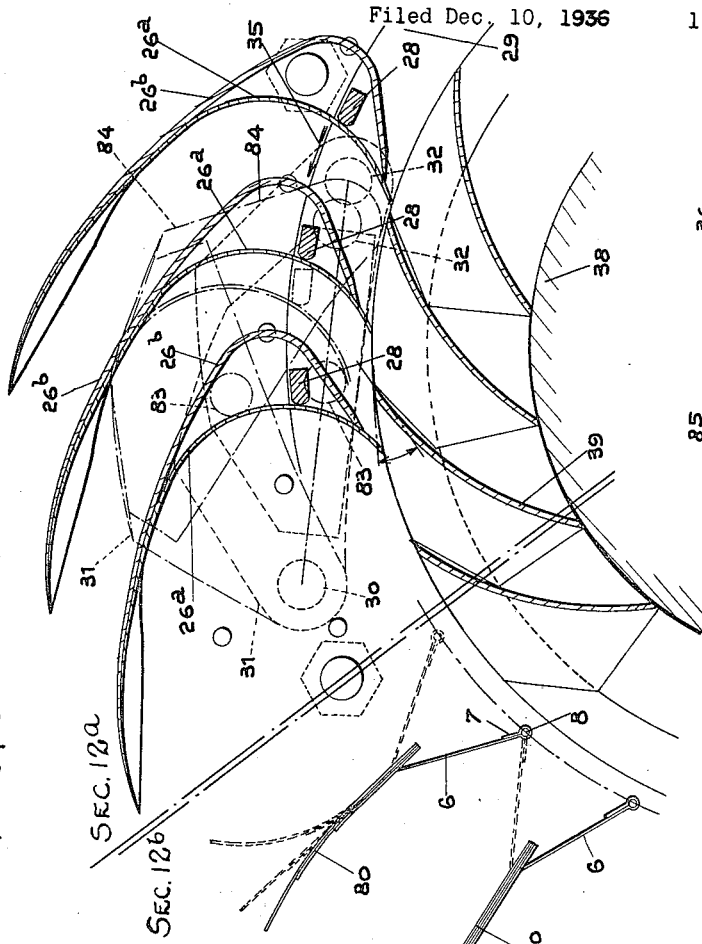

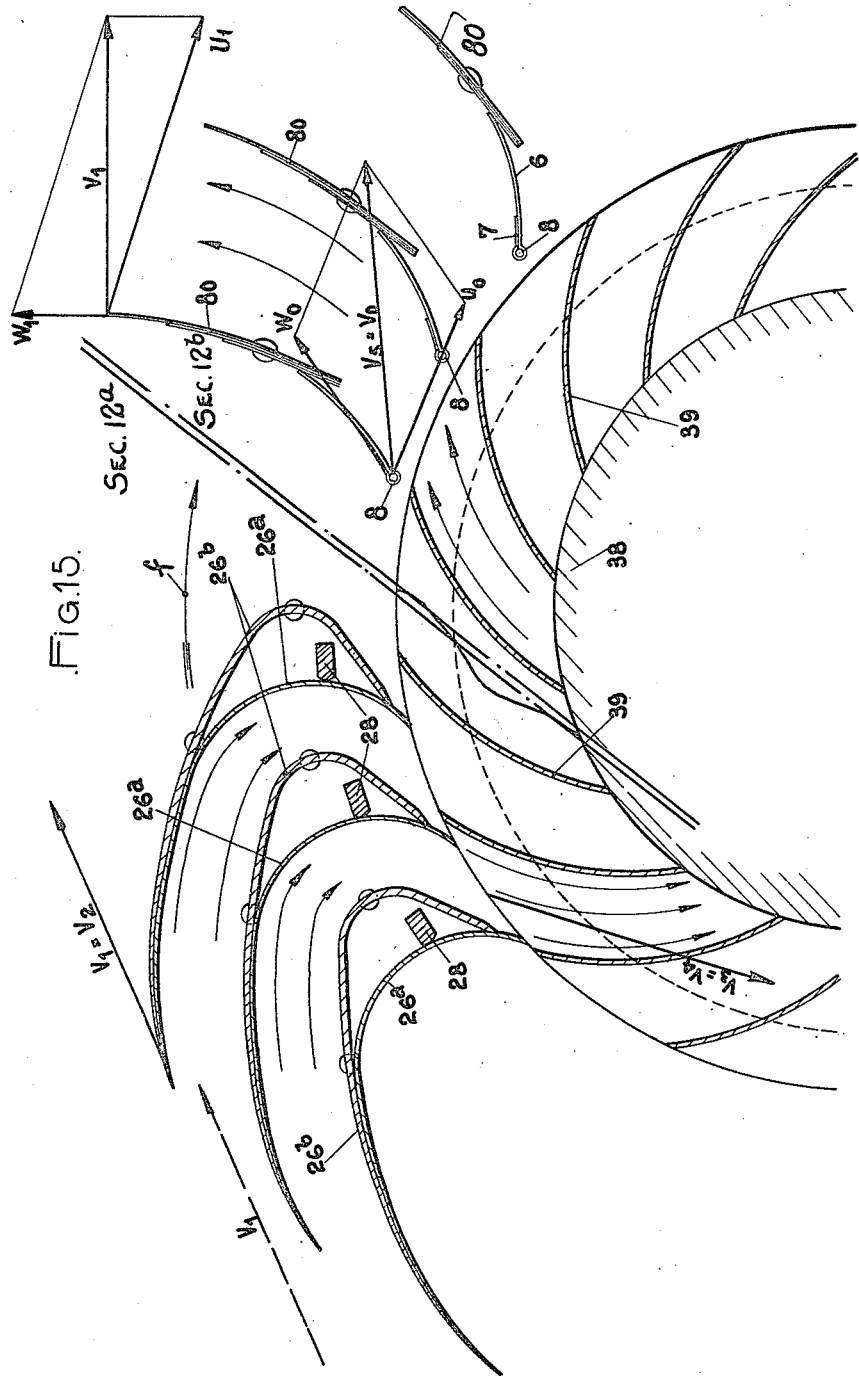

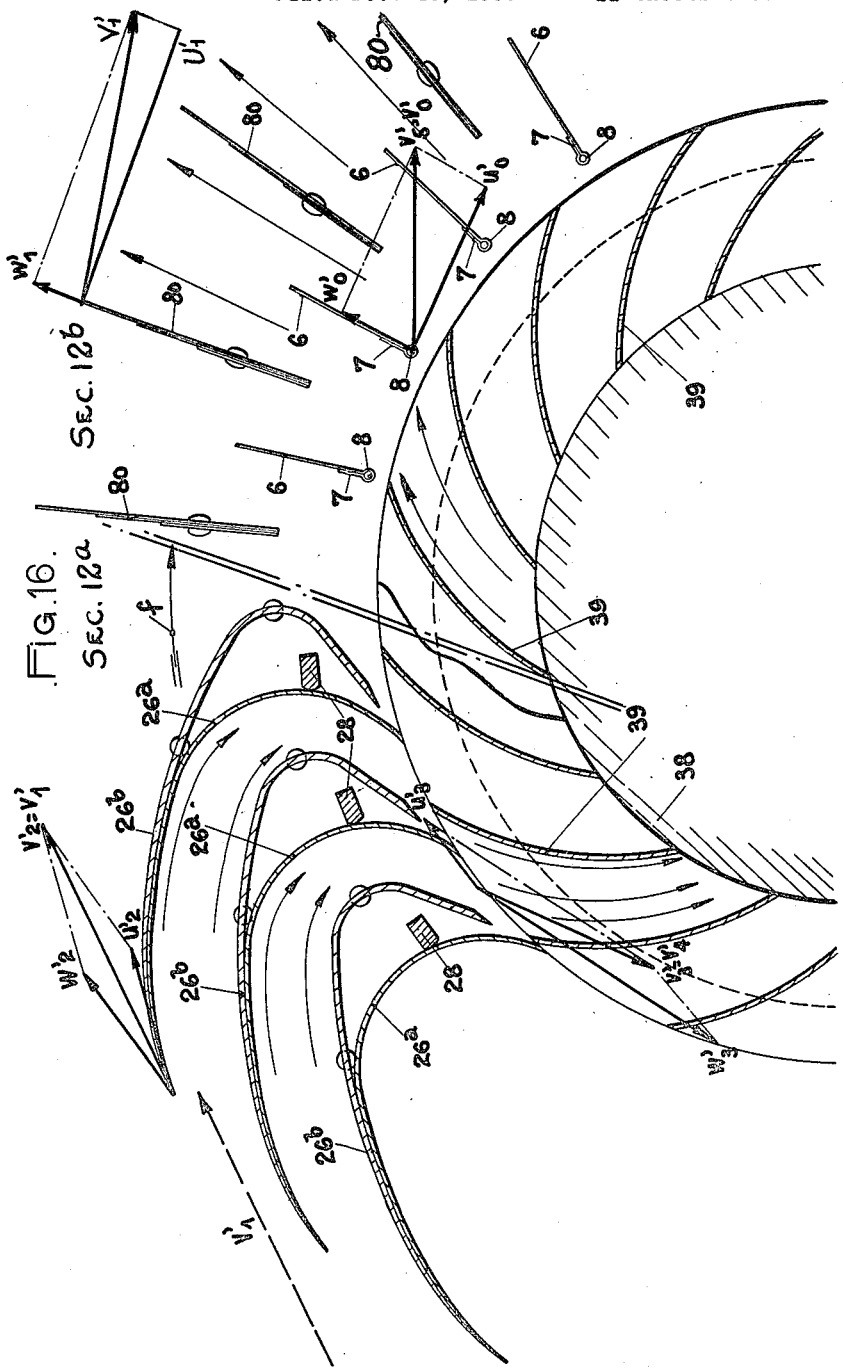

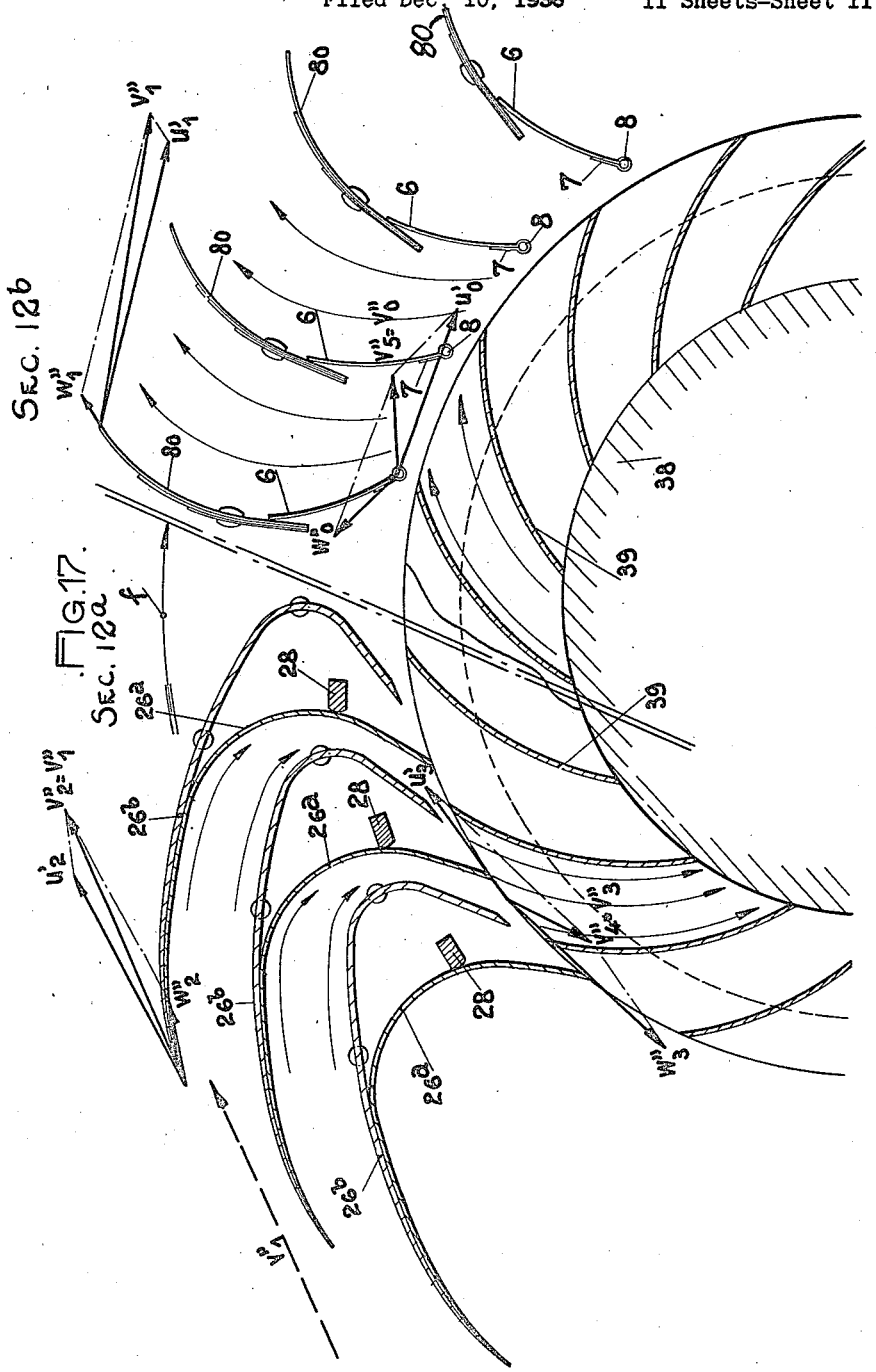

Patented Aug. 8, 1939

2,168,862

UNITED STATES PATENT OFFICE 2,168,862

HYDRAULIC DEVICE FOR THE TRANSMISSION OF POWER

Dimitri Sensaud de Lavaud, Paris, France

Application December 10, 1936, Serial No. 115,087
In France December 17, 1935

7 Claims. (Cl. 60—54)

The present invention relates to improvements in hydraulic devices for the transmission of power, in which, co-axially with a pump, rigidly secured on a driving shaft, are arranged a turbine, rigidly secured on a driven shaft co-axial with the driving shaft, and a ring provided with guide blades placed between the outlet of the turbine blades and the inlet of the pump blades, said ring, co-axial with the turbine and with the pump, being connected to the fixed frame of the device through the medium of a movement selecting device such that it prevents the rotation of said ring in reverse direction to the rotation of the pump and turbine, but that it allows this rotation in the same direction as that of these elements when the latter rotate at the same speed, that is to say when the device operates as a coupling.

The invention is mainly characterised by the fact that, in order to obtain an optimum efficiency whatever may be the gearing down ratio, that is to say whatever may be the speed ratio between the pump and turbine, the blades of the turbine have a rigid convex dorsal portion and a flexible concave ventral portion, and the blades of the pumps have at least a flexible portion at their inlet ends.

The present invention also includes a number of particular points which will appear from the following description with reference to the accompanying drawings, given by way of example only, in which:

Fig. 1 is a sectional elevation of a form of construction of an improved hydraulic transmission device according to the invention.

Fig. 2 is a diagrammatic sectional view, on an enlarged scale, of the hydraulic circuit proper.

Fig. 3 is a cross section made according to lines $3^a$—$3^a$, $3^b$—$3^b$, $3^c$—$3^c$, respectively of Fig. 2, from left to right of Fig. 3.

Fig. 4 is a cross section made according to lines $4^a$—$4^a$ and $4^b$—$4^b$ respectively of Fig. 1, showing more particularly the circuit of the fluid through the gear pump.

Fig. 5 is a partial cross section made according to line 5—5 of Fig. 1, showing the movement selecting device.

Fig. 6 is a diagrammatic sectional view of a constructional modification of a blade of the pump.

Fig. 7 is a diagrammatic sectional view of the vanes of the turbine and of those of the pump upon starting of the turbine and for a speed zero of the latter.

Fig. 8 is a diagrammatic view similar to that of Fig. 7 for a speed of rotation of the turbine equal to about one half that of the pump.

Fig. 9 is a diagrammatic view similar to Figs. 7 and 8, but for a speed of rotation of the turbine substantially equal to ¾ of that of the pump.

Fig. 10 is an axial sectional elevation of a second form of construction of an improved hydraulic transmission device according to the invention.

Fig. 11 is a diagrammatic view, on an enlarged scale and in cross section, of the hydraulic circuit proper, according to Fig. 10.

Fig. 12 is a section made respectively along line $12^a$ of Figs. 10 and 11 in the left-hand portion of this figure, and along line $12^b$ of Figs. 10 and 11 in its right-hand portion, showing respectively the blades of the pump and those of the turbine.

Fig. 13 is a partial section made according to line XIII—XIII of Fig. 11, showing the hydraulic connection device between the shell of the turbine of the ring of magnetic metal mounted on the latter and forming a part of the electromagnetic coupling device.

Fig. 14 is a detail cross section made according to line XIV—XIV of Fig. 10, showing a form of construction of a pressure pump with inner gears.

Fig. 15 is a diagrammatic sectional view of the vanes of the turbine and of those of the pump upon starting of the turbine and for a speed zero of the latter.

Fig. 16 is a diagrammatic view similar to that of Fig. 15 for a speed of rotation of the turbine equal to about one half that of the pump.

Fig. 17 is a diagrammatic view similar to Figs. 15 and 16, but for a speed of rotation of the turbine approximating that of the pump.

Fig. 18 is a front view of the device automatically controlling the deformation of the ventral parts of the turbine blades, this device being shown in lateral elevation in Fig. 11.

In the various figures of the drawings, the same reference numbers or characters designate the same parts or parts fulfilling the same function.

On a driving shaft 1 is secured, by bolts 3, the shell $2^a$ of a pump, the other shell $2^b$ of which is connected to the shell $2^a$ by any suitable means. Thus, in the example illustrated, both shells are rendered rigid together by means of screws 4 arranged in flanges provided on the periphery of shells $2^a$ and $2^b$. Fluid-tightness between these two shells is ensured in any suitable manner and for instance by a ring 5, having a circular cross section, made of a relatively plastic or malleable material and fitting into grooves of corresponding shape provided in the opposite faces of shells 2ᵃ and 2ᵇ.

On the shell 2ᵇ of the pump are secured blades which, according to the invention, are flexible at least on the side the fluid enters the pump. For that purpose, each blade of the pump is constituted, in the first place, by a rigid part 11 located at the place where the fluid issues from the pump and which is secured, by any suitable means, on the one hand, on the shell 2ᵇ, or on a cheek member 9 rigid with this shell 2ᵇ and, on the other hand, on a circular inner crown or ring 10 (see Figs. 2 and 3). Each of these rigid parts 11 is preferably arranged in a plane passing through the axis of rotation common to the turbine and to the pump. In the second place, each blade of the pump 2 is constituted, on the side the fluid enters said pump, by a flexible vane 6.

At the end of this vane 6, located on the side the fluid enters pump 2, the edge of said vane 6 is bent down at 7 for forming a socket in which fits a rod 8 the ends of which are secured, on the one hand, in the shell 2ᵇ or in the circular cheek member 9 rendered rigid with this shell 2ᵇ and, on the other hand, in the circular inner crown or ring 10. It will therefore be seen that said vane 6 can pivot about rod 8 at the same time as it becomes distorted under the action of the thrust exerted by the fluid. In order to limit this pivotal movement, each of the vanes 6 has such a length that it abuts, at its free edge, on the two rigid parts 11 adjacent to the vane 6 under consideration and located on the side the fluid issues from pump 2. The position of the rod 8, relatively to these two rigid parts 11 is determined in any suitable manner and it is for instance located, as illustrated, midway of the distance separating these two rigid parts 11, but it is obvious that this rod 8 might be placed in any other intermediate position for obtaining a suitable distortion of said flexible vane 6 for a definite thrust of the fluid.

According to the invention, the pump blades can also be constituted by vanes flexible throughout their length without utilizing fixed blade portions as shown in Figure 6. In this case, the blades would be secured, on the one hand, by the rods 8 and, on the other hand, by rods secured on said vanes at an intermediate point of their length, but preferably situated nearer the outlet edge than to the edge where the fluid enters, these rods being guided in diametral planes on the shell 2ᵇ of the pump, or on the cheek member 9 and on the inner circular crown or ring 10, so as to allow bending of said vanes 6 under the action of the thrust exerted by the fluid.

The blades of the pump 2 might also be constituted by rigid vanes substantially arranged in diametral planes.

On the crown 10 is secured, by screws 13 for instance, a ring 14, made of magnetic material, which serves as fixed armature for the winding 15 of an electromagnet, the function of which will be explained later on. One of the ends of this winding is earthed or grounded, whilst its other end is connected to a terminal 16 secured on the shell 2ᵇ of the pump in any suitable manner, but electrically insulated therefrom. This terminal 16 is electrically connected, by a wire 17 or the like, insulated from the shell 2ᵇ, to a collector ring 18 rendered rigid with said shell 2ᵇ by rivets 19 or the like, but electrically insulated therefrom.

A brush 20 wipes against this ring 18, and this brush 20 is secured on the fixed casing 21 of the device by any suitable means. At its end, this brush 20 is provided with a suitable current supply device.

At the end of a shaft 22, which can be either the driven shaft itself, or be connected to the latter by a gear relay or the like, is rigidly secured the hub 23 of the shell 24 of the turbine of the hydraulic device. This hub 23 is rotatably mounted on the driving shaft 1 or on the shell 2ᵃ of the pump which is rendered rigid therewith by means of a ball bearing 25, or the like carried by the driving shaft 1. On the shell 24 of the turbine, blades 26 are secured as will now be described. Each of these blades 26 is constituted by two elements 26ᵃ and 26ᵇ lying adjacent at their inlet ends. The element 26ᵇ of each blade, which constitutes the dorsal face of the latter, is rigidly secured at both its ends and by any suitable means, on the one hand, on the turbine shell 27, and, on the other hand, on an inner cheek member 27 which is thus rendered rigid with the turbine shell 24. In a convenient form of construction, the element 26ᵇ of the blade is provided, at both its ends, with two small side projections fitting into suitable perforations formed in the shell 24 and cheek member 27, and which are subsequently bent down or riveted on the outer sides of this shell 24 and cheek member 27.

The element 26ᵇ of the blade is rigid, whilst the ventral portion 26ᵃ is resilient. The resiliency of this ventral part 26ᵃ is such that it tends to move the outlet edge of this part 26ᵃ in contact with the dorsal element 26ᵇ of the blade located behind it in the direction of the rotation, so as to reduce the section of the passageway for the fluid between two adjacent blades but without completely blocking said passageway.

Between the ventral part 26ᵃ and dorsal part 26ᵇ of each of the blades is arranged a finger 28, or the like, which is normally in contact with the ventral part 26ᵃ of the blade when the hydraulic device operates. The various fingers 28 are secured on a ring 29 angularly movable relatively to the cheek member 27 and, consequently, relatively to the turbine shell 24. The relative angular displacement of this ring 29 is automatically produced in function of the speed of rotation of the turbine by any suitable means, in such a manner that an increase of speed of the turbine produces a rotation of the ring 29 carrying the fingers 28 in such a direction that these fingers 28 act on the ventral element 26ᵃ for pushing it back so as to reduce the section of the passageway for the fluid between two adjacent blades; in other words, these fingers 28 act in the same direction as the resiliency of the elements 26ᵃ of the blades when the speed of the turbine increases.

An example of construction of a device for automatically controlling the rotation of ring 29 will now be described. On the crown 27 and at two diametrally opposed points are secured two studs 30 on each of which is pivoted a centrifugal member 31 having substantially the shape of a semi-circular ring. The free end of this centrifugal member 31 is rendered rigid with a pin 32 secured on the movable ring 29, said pin 32 passing through a suitable aperture 33 provided in the crown 27 and which is concentric with the pivot pin 30 of the corresponding centrifugal member 31.

Likewise, and in order to allow the rocking movement of centrifugal member 31, the pin 32 passes through an aperture 34 of the centrifugal member and this aperture is extended according to a radius passing through the pivot pin 30 of this centrifugal member 31. The operation will be easily understood. As soon as the speed of the turbine increases, centrifugal force tends to cause the centrifugal members 31 to rock, the pins 32 are moved in the direction of the arrow 35 and cause the ring 29 to rotate in the direction of this arrow 35. The centrifugal members 31 can be restored in the centripetal direction by any suitable means, such as springs, but the springs can be omitted, and alone the action of the fluid on the elements 26a of the turbine blades can be utilised for restoring the centrifugal members 31, as will be explained later on.

A circular ring 36, made of magnetic metal, is secured on the cheek member 27 of the turbine by any suitable means. This ring 36 is located opposite the ring 14 serving as armature for the electromagnet 15 rigid with the shell 2b of pump 2. It will be easily understood that the energization of electromagnet 15 causes the ring 36 to be attracted, and the turbine 24 and pump 2 are then rendered rigid together. The circuit of electromagnet 15 can be closed manually.

The rings 36 and 14 and the inner peripheral shape of shells 2a, 2b and 24 are such that, at the outlet of the pump blades is formed a passage 37 without blades and constituting an enlarged channel or diffuser for the fluid flowing from the pump outlet to the turbine inlet. For that purpose, the variations in the section of the passage 37 between these two places will correspond to those usually admitted for a diffuser.

In other words, the passage 37 will have a divergency between the pump outlet and the turbine inlet substantially corresponding to that of a diffuser having rectilinear sides forming together an angle of about 7°. Such a diffuser considerably improves the operation of the hydraulic device and constitutes a very important feature of the present invention.

A ring 38, provided with blades 39, is concentric with the axis of rotation common to the turbine 24 and pump 2.

These blades 39 form inlet and outlet angles which are substantially equal; moreover, their inlet edge and their outlet edge are substantially situated at the same distance from the axis of rotation common to the turbine and pump.

Likewise, the flexible vanes 6 forming a part of the blades of pump 2 have their inlet edges substantially situated at the same distance from the axis of rotation as the outlet edges of the blades 26 of turbine 24, and the inlet edges of the blades 26 of this turbine 24 are also situated substantially at the same distance from the axis of rotation of the various elements of the hydraulic device as the outlet edges of the fixed portions 11 of the pump blades.

The blades 39 are fixed and serve to direct and set right the fluid stream from the outlet of the turbine blades to the inlet of the pump blades, so that the fluid enters, according to a correct angle, the blades 6 of pump 2. The shell 38 of this guide vane ring is loosely mounted through the medium of a ball bearing 40, or the like, on the hub 23 of the turbine shell 24. On the other hand, on pins 41, fitted on the shell 38 of the guide vane or ring, are pivoted pawls 42 normally coming in engagement with the teeth of a ratchet 43 rigidly secured on the end of a sleeve 44, the other end of which is secured, by screws 45 for instance, on a member 46 rigid with the fixed frame 21 of the device. The pawls 42 are so arranged as to prevent the rotation of the guide vane ring 38 in reverse direction to that of turbine 24 and pump 2. These pawls 42 are balanced in order to release at a certain predetermined speed, so that, when the pump 2 and turbine 24 rotate at the same speed either owing to the hydraulic locking, or owing to the operation of the electromagnetic device rendering the turbine and pump rigid together, the guide vane ring 38 can be driven in the same direction and at the same speed as these two apparatus without the pawls 42 remaining in contact with the teeth of ratchet 43.

In order to avoid cavitations within the hydraulic circuit and to compensate for the unavoidable leakage of liquid, the fluid is put under pressure within the hydraulic device, by means of a gear pump for instance. In the form of construction illustrated by Figure 4, this pump is constituted by two pinions 47 and 48 meshing together and arranged within a suitable casing constituted, on the one hand, by the member 46 and, on the other hand, by a member 61 on which is attached the securing flange 62 of the fixed sleeve 44.

The pinion 48 is loosely mounted on a stud 49 secured to the casing of said gear pump, whilst pinion 47 is rendered angularly rigid, with a sleeve 50, concentric with sleeve 44 and the other end of which is rendered rotatable with a ring 51 secured, by screws 52 for instance, on the pump shell 2b. The suction of this pump exerts itself through a piping 53, the free end of which opens in a casing 54 constituted by the fixed frame 21 of the transmission device.

According to the invention, the delivery of said gear pump passes from the chamber 55 which connects to a conduit 56 connected to a piping 58. This piping 58 is connected to a suitable radiator 70, or the like, the outlet of which is connected to a piping 59. This piping 59 is connected to a conduit 60 provided in the member 61 rigid with the frame 21 of the device and serving as casing for the pump. This conduit 60 opens in an annular chamber 63, communicating with the annular space 64 provided between sockets 44 and 50, which space communicates in its turn with the interior of the hydraulic device. The fluid leaves the converter through the bearing 25, the axial boring of the shaft 22 and, through radial holes of the latter, it returns to the casing 54.

It will therefore be seen that, by means of this arrangement, the fluid, delivered by the gear pump 47—48, passes into a radiator 70, or the like, before entering the hydraulic device proper. It will therefore be possible to cool the fluid to any desired temperature when this fluid tends to heat up, as this is particularly the case when the hydraulic device operates during a very long time with a gearing down ratio. It is obvious that filters or the like can be arranged on the path followed by the fluid.

Suitable fluid-tight packings 57 are provided at the various places where the pressure of the fluid is exerted, and in particular between the casing or frame of the device and the interior of the hydraulic circuit proper.

The operation of the improved hydraulic device according to the invention will now be described in greater detail, particularly concerning the fluid circuit proper when the device operates with hydraulic gearing down ratio, that is to say, when the turbine rotates less rapidly than the pump. It is known, in this case, that for each ratio between the speeds of rotation of the turbine and pump, it is indispensable, for obtaining satisfactory efficiency, that the various inlet and outlet angles of the turbine blades and at least the inlet angle of the pump blades should automatically vary in function of the relative speeds between the pump and turbine.

For greater clearness, the operation of the device will be described from the starting of the turbine. Reference will be made for that purpose to Fig. 7 of the drawings. Owing to the rotation of pump 2, the fluid is rotatively driven as a real body about the axis of rotation of the various elements of the device and in the direction of the arrow $f$. This fluid flywheel encounters the blades 26 of turbine 24, which blades are fixed since said turbine is stationary. The fluid then enters the blades of this turbine according to the direction $V_2$ and at a speed $V_2$. This fluid acts on the ventral element $26^a$ of the blades for pushing it back, in antagonism to its resiliency, and moving it to the position shown in full lines in Fig. 7. Owing to the fact that turbine 24 does not yet rotate, the fluid issues with a speed $V_3$ which is substantially equal to $V_2$, assuming the section of the passageway remains constant throughout the path followed by the fluid in the blades 26, the friction not being taken into consideration. The applicant has found that, in practice, it was convenient to slightly increase the speed $V_3$ of issue of the fluid by slightly reducing the section of the passageway.

Turbine 24 being assumed stationary, the fluid enters the blades 39 of the guide vane ring 38 according to a speed $V_4$ equal to and of the same direction as $V_3$. This fluid issues from the guide vane ring 38 at a speed $V_5$ substantially equal to $V_4$, the losses by friction not being taken into consideration and assuming the section of the passageway is the same at the inlet and at the outlet of said guide crown 38 and that the inlet and outlet angles of the blades of the latter are equal.

The fluid enters the pump 2 according to a direction $W_0$ which is the relative speed of admission of the fluid and which is the component of the absolute speed $V_0$ of admission of the fluid equal to $V_5$ with the tangential speed $U_0$ of the pump. The fluid having this speed $W_0$ acts on the flexible vanes 6 forming a part of the pump blades and curves or bends them as shown in Fig. 7 in antagonism to their resiliency.

The fluid issues from the pump blades through the fixed parts 11 according to an absolute speed $W_1$ which is substantially radial and combines with the tangential speed $U_1$ of pump 2 for giving a relative speed $V_1$ of issue of the fluid which is to be found once again at the outlet of the diffuser 37 provided in pump 2.

The fluid to which the speed $V_1$ is imparted acts on the blades of the turbine and tends to cause the latter to rotate in the direction of arrow $f$. The turbine therefore rotates in the same direction as the pump.

The operation of the device will now be considered when the turbine rotates at a certain speed which has been chosen, in the present case, equal to half that of the pump (Fig. 8). The various speed vectors are designated by the same references as in Fig. 7, but with the index "prime".

The absolute speed of admission of the fluid $V'_2$ into the turbine combines with the tangential speed $U'_2$ for giving a relative speed of admission of the fluid $W'_2$ into this turbine. This speed $W'_2$ is smaller than the speed $V'_2$ (Fig. 7), so that the ventral portion $26^a$ of the turbine blades curves in the direction of the arrow $f'$ under the influence of its resiliency and of the action of the centrifugal members 31. The section of the passageway for the fluid diminishes towards the outlet of the turbine blades and the speed of flow of the liquid increases from the inlet to the outlet of the turbine blades. The relative speed with which the fluid $W'_3$ issues from the turbine combines with the tangential speed $U'_3$ for giving the absolute speed of issue to $V'_3$ of the fluid which is equal to the speed of admission $V'_4$ of the fluid into the recuperator.

The fluid issues from the guide vane ring 38 provided with the guide blades 39 at a speed $V'_5$ equal, the frictions being neglected, to the speed $V'_4$. This speed $V'_5$ combines with the tangential speed $U'_0$ of the pump for giving the relative speed of admission $W'_0$ into the pump. In the example chosen, this speed $W'_0$ is radially directed so that the flexible parts 6 of the pump blades are also radially directed for this value of the gearing down ratio between the pump and the turbine. It will be very easily understood that it is possible, by a judicious choice of the inlet angles of the turbine and guide vane ring and of the distances separating the inlet and the outlet of the pump blades and turbine blades, to obtain this radial direction of the flexible parts 6 of the pump blades for any desired value of the gearing down ratio between the pump and the turbine.

When the speed of the turbine exceeds, for one and the same speed of the pump, the value corresponding to that of the diagram of Fig. 8, reference will be made to the diagram of Fig. 9 in which the various speed vectors are designated by the same references as in Figs. 7 and 8, but with the index "second". It will be seen that the speed of circulation or relative speed of admission $W''_2$ of the fluid into the turbine further diminishes; the thrust of the fluid on the element $26^a$ of the turbine blades therefore diminishes so that, under the influence of their resiliency and of the fingers 28 moved by the centrifugal members 31, said element $26^a$ still further reduces the section of the passageway for the fluid at the outlet of the turbine blades.

It will also be seen that the absolute speed $V''_0$ of the fluid at the inlet of the pump blades combines with the tangential speed $U''_0$ for giving a relative speed $W''_0$ of admission of the fluid or speed of flow which will tend to curve the flexible portion 6 of the pump blades as shown in Fig. 9, that is to say in reverse direction to the curvature that this flexible portion 6 had upon starting of the turbine (Fig. 7).

When the turbine and the pump rotate at the same speed, owing to the setting in action of the coupling device provide between the turbine and the pump, there is no longer any relative sliding movement between these two elements, the absolute speed of admission $V_2$ into the turbine is null, there is therefore no longer any circulation of fluid within the hydraulic circuit. From this fact, $W_2$ is null and the ventral element $26^a$ of the turbine blades fits, by its outlet edge, on to the dorsal element $26^b$ of the adjacent blade, thus completely obturating the passage of the fluid in the turbine. The guide vane ring is then rotatively driven in the same direction as the turbine and pump, owing to the fact that the speed $V_4$ is null and cannot therefore act for causing said guide vane ring to be held stationary.

The fact of forming the turbine blades 26 of two elements 26ª and 26ᵇ, the ventral element 26ª of which is resilient so as to move towards the dorsal element 26ᵇ of the adjacent blade and thus throttle the passageway for the fluid, has moreover an important advantage. In fact, it will be understood that, owing to the peculiar resiliency of the element 26ª, the fluid will be able to push back this element 26ª only when its speed of circulation will reach a certain value. Upon starting, this speed of circulation of the fluid in the turbine is equal to $V_1$, that is to say is function of the speed of rotation of the pump. It will therefore be understood that, for a speed of rotation of the pump lower than a certain value, the turbine will not be rotatively driven; this prevents in particular the use of devices for braking or checking the rotation of this turbine when a mechanical reversing device is used and allows moreover the pump to rotate at a low speed without the turbine being driven, as well as the setting in circulation of the fluid which causes a prejudicious heating up of the fluid and an unnecessary consumption of energy on the driving shaft.

The second form of construction illustrated in Figs. 10 to 18 is similar to that described with reference to Figs. 1 to 9, except concerning in particular the constitution of the pump blades, the arrangement of the electromagnetic members provided between the shells of the pump and turbine and rendering these latter rigid together, and the device controlled by centrifugal force and causing the distortion of the resilient vanes constituting the ventral portion of the turbine blades. Therefore, these new elements alone will be described. In Figures 10 to 18 the parts identical to those in Figure 1 are given the same reference numerals.

On the shell 2ᵇ of the pump are secured blades which, in this form of construction are constituted as follows: On the fluid outlet side of the pump are arranged a number of regularly spaced blades 80 constituted by at least one resilient vane the portion of which nearest the axis of rotation of the device is secured, by any suitable means, on the one hand, on the shell 2ᵇ and, on the other hand, on an inner circular crown 10 (see Figs. 10 and 11), so as to be rigid on a certain height directed substantially according to a diametral plane.

In a form of construction which for the moment appears to be advantageous, each blade 80 is constituted by a number of resilient vanes of different lengths connected together by any suitable means and secured on the shell 2ᵇ and on the crown 10 by means of side projections 81 fitting into suitable housings formed in the shell 2ᵇ and crown 10, respectively. Such a construction allows of obtaining a blade 80, the resiliency of which varies from the rigid portion used for securing the blade, to the free or outlet end of said blade.

On the other hand, on the side where the fluid enters the pump are provided a number of flexible blades 6, the number of which is equal to that of the blades 80 and each constituted by a resilient vane. At the end of this vane 6, located on the side the fluid enters the pump 2, the edge of said vane 6 is bent down at 7 for forming a socket in which fits a rod 8 the ends of which are secured, on the one hand, in the shell 2ᵇ and, on the other hand, in the inner circular crown 10.

It will therefore be seen that said vane 6 can pivot about the rod 8 at the same time as it becomes distorted under the action of the thrust of the fluid. In order to limit this pivotal movement, each of the vanes 6 has such a length that it abuts, at its free edge, against the central rigid end of one of the two blades 80 adjacent to the vane 6 under consideration and located on the side where the fluid issues from the pump 2. The position of the rod 8, relatively to these two blades 80, is determined in a suitable manner, and it is for instance situated, as shown in Fig. 12, midway of the distance separating these two blades 80, but it is obvious that this rod 8 might be placed in any other intermediate position for obtaining a suitable distortion of said flexible vane 6 for a definite thrust of the fluid.

It will be seen that, by means of such an arrangement, it is possible to obtain, for a given thrust of the fluid, a blade having a suitable curvature, as shown in Figs. 12, 16 and 17 of the drawings.

On the shell 2ª of the pump is provided a crown or ring 14', made of magnetic material, which serves as fixed armature for the winding 15' of an electromagnet the function of which will be explained later on. One of the ends of this winding 15' is earthed, whilst its other end is connected, by a wire 17', to a collecting ring 18' secured on the shell 2ª of the pump in any suitable manner, but which is electrically insulated therefrom.

A brush or the like 20' resiliently wipes on this ring 18', and said brush 20' is secured on the fixed casing 21' of the device by any suitable means. At its end, this brush 20' is provided with a suitable current supply connection.

At the end of a shaft 22, which can be either the driven shaft itself, or be connected to the latter by a gear or like relay, as will be explained later on, is rigidly secured the hub 23 of the shell 24 of the turbine of the hydraulic device. This hub 23 is centered on the driving shaft 1, or on the shell 2ª of the pump which is rendered rigid therewith by any suitable means. On the shell 24 of the turbine are secured blades 26, in a similar manner to that described with reference to the first form of construction illustrated in Figs. 1 to 9.

In this second form of construction, the device automatically controlling the rotation of the ring 29 is constructed as follows:

On the crown 27 is secured a stud or pin 30 on which is pivoted an eccentric centrifugal member 31 on which a pivot pin 83 is secured. On this pivot pin 83 is also pivoted a centrifugal member 84 having a shape similar to that of the centrifugal member 31 and the other end of which is journalled about a pivot pin 32 secured on the movable ring 29. The operation will be easily understood. As soon as the speed of the turbine increases, centrifugal force tends to cause the centrifugal members 31 and 84 to pivot, the pivot pin 32 is driven in the direction of the arrow 35 and causes the rotation of ring 29 in the direction of this arrow 35. The centrifugal members 31 and 84 can be restored in position in the centripetal direction by any suitable means, such as springs, but these springs can be omitted, and alone the action of the fluid exerted on the elements 26ª of the turbine blades, as will be explained later on, can be relied upon for restoring these centrifugal members 31 and 84 in position. A plurality of devices similar to that described above can be provided.

On the shell 24 of the turbine is secured, by any suitable means, a circular ring 36, made of magnetic metal. This ring 36 is located opposite the ring 14' serving as armature for the electromagnet 15' rigid with the shell 2ᵇ of pump 2.

The operation of this electromagnetic device is the same as that described with reference to Fig. 1 of the drawings.

In this form of construction and in order to avoid the shells of the pump and turbine being suddenly rendered rigid together when the electromagnet 15' is energized, instead of rigidly securing the ring 36 on the shell 24 of the turbine, this ring 36 can be connected to the shell 24 by means of resilient, hydraulic or like devices. In a form of construction which for the moment appears to be advantageous, the ring 36 is provided with a number of radial grooves or flutes 85 in each of which fits a radial rigid blade 86 (Fig. 13).

The various blades 86 move in a circular enclosure 87 bound, on the one hand, by the shell 24 of the turbine, and, on the other hand, by a crown or ring 88 to which the blades 86 are secured by any suitable means. Fluid-tightness between said crown or ring 88 and the shell 24 of the turbine is ensured by the fact that, in its inner portion, this crown 88 fits between the side face of said shell 24 and a cheek member 89 secured on said shell 24 by any suitable means, such as rivets 90.

A number of radial blades 91 rigid with the shell 24 of the turbine are provided within said circular enclosure 87 between the radial blades 86. The whole is filled with liquid or other suitable fluid, preferably under pressure, and in a convenient embodiment, the fluid filling the enclosure is the same and is under the same pressure as that filling the hydraulic circuit. When the winding 15' is not energized, the ring 36 rotates freely into the shell 24 of the turbine without contact between the blades 86 and 91. But, when the winding 15' is energized, the ring 36 is immediately applied upon the crown 14' of the pumps and the liquid between the blades 91 and 86 is laminated and creates a damping effect avoiding a prejudicious shock between the blades 86 and 91.

Concentric with the axis of rotation common to the turbine 24 and pump 2, is arranged a ring 38 provided with blades 39 and which is similar to that described in the first form of construction with reference to Figs. 1 to 9 of the drawings. The arrangement of the inlet and outlet edges of the various blades of the pump, turbine and of the guide blades 39 is similar to the arrangement shown in the form of construction of Figs. 1 to 9. Likewise, the shell 38 carrying the guide blades is mounted in a manner similar to that shown in Fig. 5 of the drawings.

In order to avoid cavitations within the hydraulic circuit and for compensating the unavoidable leakage of liquid, the fluid is put under pressure within the hydraulic device by means of a gear pump for instance. In this second form of construction illustrated in particular in Figs. 10 and 14, this pump is constituted by an internally toothed ring gear 92 and a pinion 47 gearing together and housed within a casing suitably composed, on the one hand, of a member 46 and, on the other hand, of a securing flange 62 of the fixed sleeve 44.

The toothed ring gear 92 is loosely mounted, whilst the pinion 47 is rendered angularly rigid, by a clutch for instance, with a socket 50, concentric with the socket 44 and the other end of which is rigid with the shell 2ᵇ of the pump. The suction of this pump takes place through a piping 53, the free end of which opens in a perforation 54 provided in the fixed frame 21 of the transmission device and communicating with the suction chamber proper 93 of the pump.

The delivery of said gear pump takes place in a chamber 55 in which opens a conduit 56 which opens, on the other hand, in an annular recess 94. This annular chamber 94 communicates with the annular space 64 provided between the sockets 44 and 50, which annular space 64 communicates in its turn with the interior of the hydraulic device. The fluid leaves the converted through conduits 57ᵃ, enters the axial boring of the shaft 22 and returns to casing 21 through suitable radial holes provided in the said shaft 22.

The shell 38 of the ring carrying the guide blades 39 is laterally centered by suitable abutments 95, such as Mitchell abutments, between the shell 2ᵇ of the pump and the shell 24 of the turbine.

Suitable fluid-tight packings 57 are provided at the various places where the pressure of the fluid is exerted, and in particular between the casing or frame 21 of the device and the interior of the hydraulic circuit proper.

Concerning the operation of the second form of construction of the hydraulic device described with reference to Figs. 10 to 17, this operation is similar to that described for the first form of construction with reference to Figs. 7, 8 and 9 and will not be described here in greater detail. The same reference numbers or characters designate the same parts or the same speed vectors in Figs. 15, 16 and 17 as in Figs. 7, 8 and 9 which substantially correspond thereto. One of the essential differences resides in that, owing to the fact that the rigid portion 11 of the pump blades is replaced by a flexible portion 80, the absolute outlet speed $W_1$ of the fluid of the pump, instead of being always directed radially, is in the case of Fig. 15, rearwardly inclined relatively to the direction of rotation of said pump and, in the case of Fig. 17, it is forwardly inclined relatively to this direction of rotation.

In order to facilitate the cooling of the fluid contained within the hydraulic circuit, the shell 2ᵇ of the pump can be externally provided with a number of blades 126 acting as a fan and adapted to accelerate the circulation of air along the shell 2ᵇ, suitable openings 127 being provided in the casing 21.

The present invention also relates to a reversing device provided with gears constantly in engagement and constituted as follows: On one of the ends of the shaft 22, on the other end of which is rigidly secured the hub 23 of the shell 24 of the turbine, is provided a bevel sun wheel 96. This bevel sun wheel 96 meshes with a number of bevel planet pinions 97 journalled about radial pins 98 secured on a drum 99 provided at the end of a socket 100. A cheek member 101, secured on the end of drum 99 by bolts 102, serves as side abutment for the bevel sun wheel 96. The bevel planet pinions 97 mesh, on the other hand, with a bevel sun wheel 103 provided at the end of the driven shaft proper 104. On the other end of this driven shaft 104 is rigidly secured a coupling plate 105 or the like. This shaft 104 is journalled in the frame 21 of the device through the medium of a ball or like bearing 106.

The periphery of the socket 100 is fluted and a sleeve 107, having corresponding flutes, is mounted on said socket so as to be angularly rigid therewith, but so as to be capable of axially moving relatively to said sleeve by any suitable means. For that purpose, the sleeve 107 is provided with a groove or the like 108 in which fit the two arms of a fork-member 109 guided parallel to the axis of shaft 104 by means of a rod or the like 110 rigid therewith and which is itself guided in corresponding bearings 111 provided on the frame 21. At its upper part, this fork-member 109 has a housing 112 into which fits the end 114 of a lever 116 having a spherical portion and pivoted at 115 in a member 117 secured on the casing or frame 21.

On shaft 104 is keyed a socket provided on its periphery with teeth 119, corresponding to the flutes formed on the periphery of socket 100, and with which can engage the inner flutes of the sleeve 107 when the latter is moved in the direction of the arrow 120 by means of lever 116, so as to render said sleeve 107 angularly rigid with the shaft 104, for the purpose which will be explained later on.

At the opposite end of socket 118, the sleeve 107 is provided with outer teeth 121 which can engage, when the sleeve 107 is moved, in a direction reverse to that indicated by the arrow 120, by means of the lever 116, with corresponding inner teeth 122 provided on a crown 123 rendered rigid, by any suitable means such as screws 124, with the frame or casing 21 of the device. A ball 128, pushed back by a spring 129 can enter housings 130, 131 and 132 respectively corresponding to the three positions above defined and formed in the rod 110.

The operation of this reversing gear is as follows:

When the sleeve 107 is in its central position shown in Fig. 10 of the drawings, it will be seen that the socket 100, comprising the drum 99 with which are rigid the pins 98 of planet pinions 97, can loosely rotate, so that the driven shaft 104 remains stationary when the intermediate shaft 22 is rotatively driven. This is the "rest" or "dead center" position.

When the user moves lever 116 in the direction of the arrow 125, he causes the displacement of sleeve 107 in the direction of the arrow 120, so that this sleeve 107, and consequently the socket 100, are rendered angularly rigid with the socket 118 and therefore with the driven shaft 104. It will then be seen that the intermediate shaft 22 is rendered rigid with the driven shaft 104. This is the direct drive position.

If, on the contrary, the user moves, from the dead center position, the lever 116 in a direction reverse to that indicated by the arrow 125, he causes the displacement of the sleeve 107 in a direction reverse to that indicated by the arrow 120, so that this sleeve 107 and consequently the socket 100 are rendered angularly rigid with the fixed crown 123 and from this fact are held stationary. It will then be seen that the intermediate shaft 22 and the driven shaft 104 rotate in reverse direction and at the same speed. This is the so-called "reverse drive" position.

Owing to this arrangement and to the fact that the bevel sun wheels 96 and 103 are identical, it will be seen that it will be possible to obtain efficient braking of the driven shaft 104 when this is required. Thus, in particular, when the power transmission hydraulic device described above in used on a motor vehicle, it will be possible, owing to this reversing gear having a gear ratio of 1/1 in reverse drive, to obtain efficient braking of the vehicle by means of the engine when this vehicle goes downhill. In fact, the user will move lever 116 to the "reverse drive" position, and this will have the effect of driving shaft 22, on which the turbine 24 is keyed, in reverse direction to that of driving shaft 1 on which the pump 2 is keyed. A stirring of the fluid within the hydraulic circuit will thus be obtained and this will have for effect to brake the driving shaft 1, or, in other words, efficient braking of the driven shaft 104 will thus be obtained through the medium of the engine.

The present invention is not limited to the forms of construction described above and illustrated, but it extends to all those utilising the features above set forth and allowing to obtain the desired result.

What I claim as my invention and desire to secure by Letters Patent is:

1. In an hydraulic transmission, a stationary casing, a driving shaft, a rotary pump secured to said driving shaft and provided with blades having at least a flexible portion at their inlet ends, a driven shaft coaxial with said driving shaft, a rotary turbine secured to said driven shaft and provided with blades having a rigid convex dorsal portion and a flexible concave ventral portion, a guide vane ring in the return circuit between said turbine and said pump, a ratchet mechanism to lock the guide wheel to the casing when the pump and the turbine rotate at different speeds.

2. In an hydraulic transmission, a stationary casing, a driving shaft, a rotary pump secured to said driving shaft and provided with blades having at least a flexible portion at their inlet ends, a driven shaft coaxial with said driving shaft, a rotary turbine secured to said driven shaft and provided with blades having a rigid convex dorsal portion and a flexible concave ventral portion, a guide vane ring in the return circuit between said turbine and said pump, a ratchet mechanism to lock said guide vane ring to said stationary casing when the pump and the turbine rotate at different speeds, the rigid convex dorsal portion and the flexible concave ventral portion of each turbine blade constituting two separate elements lying adjacent at their inlet ends.

3. In an hydraulic transmission, a stationary casing, a driving shaft, a rotary pump secured to said driving shaft and provided with blades having at least a flexible portion at their inlet ends, a driven shaft coaxial with said driving shaft, a rotary turbine secured to said driven shaft and provided with blades having a rigid convex dorsal portion and a flexible concave ventral portion, a guide vane ring in the return circuit between said turbine and said pump, a ratchet mechanism to lock said guide vane ring to said stationary casing when the pump and the turbine rotate at different speeds, the rigid convex dorsal portion and the flexible concave ventral portion of each turbine blade constituting two separate elements lying adjacent at their inlet ends, whilst the peculiar resiliency of the flexible concave ventral portion tends to move its free end towards the rigid convex dorsal portion of the adjacent turbine blade.

4. In an hydraulic transmission a stationary casing, a driving shaft, a rotary pump secured to said driving shaft and provided with blades having at least a flexible portion at their inlet ends, a driven shaft coaxial with said driving shaft, a rotary turbine secured to said driven shaft and provided with blades having a rigid convex dorsal portion and a flexible concave ventral portion, a guide vane ring in the return circuit between said turbine and said pump, a ratchet mechanism to lock said guide vane ring to said stationary casing when the pump and the turbine rotate at different speeds, the rigid convex dorsal portion and the flexible concave ventral portion of each turbine blade constituting two separate elements lying adjacent at their inlet ends, whilst the peculiar resiliency of the flexible concave ventral portion tends to move its free end towards the rigid convex dorsal portion of the adjacent turbine blade, means responsive to centrifugal force in response to speed of the turbine for exerting on said flexible concave ventral elements of turbine blades a stress having the same direction as that produced by the resiliency of said elements.

5. In an hydraulic transmission, a stationary casing, a driving shaft, a rotary pump secured to said driving shaft and provided with blades having at least a flexible portion at their inlet ends, a driven shaft coaxial with said driving shaft, a rotary turbine comprising a shell secured to said driven shaft and provided with blades having a rigid convex dorsal portion and a flexible concave ventral portion, a guide vane ring in the return circuit between said turbine and said pump, a ratchet mechanism to lock said guide vane ring to said stationary casing when the pump and the turbine rotate at different speeds, the rigid convex dorsal portion and the flexible concave ventral portion of each turbine blade constituting two separate elements lying adjacent at their inlet ends, whilst the peculiar resiliency of the flexible concave ventral portion tends to move its free end towards the rigid convex dorsal portion of the adjacent turbine blade, a ring mounted on the shell of said turbine to be angularly movable relatively to said shell, two semi-circular members responsive to centrifugal force in response to the speed of the turbine, pivoted at one of their ends on said shell, means to connect operatively the other end of said members to said movable ring, fingers secured to said movable ring and arranged to bear against the convex face of the flexible ventral portions of the turbine blades.

6. In an hydraulic transmission a stationary casing, a driving shaft, a rotary pump secured to said driving shaft and provided on the outlet side with vanes substantially arranged in diametral planes and on the inlet side with pivoted flexible blades cooperating with the vanes, a driven shaft coaxial with said driving shaft, a rotary turbine comprising a shell secured to said driven shaft and provided with blades having a rigid convex dorsal portion and a flexible concave ventral portion, a guide vane ring in the return circuit between said turbine and said pump, a ratchet mechanism to lock said guide vane ring to said stationary casing when the pump and the turbine rotate at different speeds, the rigid convex dorsal portion and the flexible concave ventral portion of each turbine blade constituting two separate elements lying adjacent at their inlet ends, whilst the peculiar resiliency of the flexible concave ventral portion tends to move its free end towards the rigid convex dorsal portion of the adjacent turbine blade, a ring mounted on the shell of said turbine to be angularly movable relatively to said shell, two semi-circular members responsive to centrifugal force in response to the speed of the turbine, pivoted at one of their ends on said shell, means to connect operatively the other end of said members to said movable ring, fingers secured to said movable ring and arranged to bear against the convex face of the flexible ventral portions of the turbine blades.

7. In an hydraulic transmission a stationary casing, a driving shaft, a rotary pump secured to said driving shaft and provided, on the outlet side with vanes substantially arranged in diametral plane but having flexible outlet ends, and on the inlet side with pivoted flexible blades cooperating with the vanes, a driven shaft coaxial with said driving shaft, a rotary turbine comprising a shell secured to said driven shaft and provided with blades having a rigid convex dorsal portion and a flexible concave ventral portion, a guide vane ring in the return circuit between said turbine and said pump, a ratchet mechanism to lock said guide vane ring to said stationary casing when the pump and the turbine rotate at different speeds, the rigid convex dorsal portion and the flexible concave ventral portion of each turbine blade constituting two separate elements lying adjacent at their inlet ends, whilst the peculiar resiliency of the flexible concave ventral portion tends to move its free end towards the rigid convex dorsal portion of the adjacent turbine blade, a ring mounted on the shell of said turbine to be angularly movable relatively to said shell, two semi-circular members responsive to centrifugal force in response to the speed of the turbine, pivoted at one of their ends on said shell means to connect operatively the other end of said members to said movable ring, fingers secured to said movable ring and arranged to bear against the convex face of the flexible ventral portions of the turbine blades.

DIMITRI SENSAUD DE LAVAUD.